United States Patent
Keselman et al.

(10) Patent No.: US 11,752,632 B2
(45) Date of Patent: Sep. 12, 2023

(54) ACTUATED MECHANICAL MACHINE CALIBRATION TO STATIONARY MARKER

(71) Applicant: FANUC AMERICA CORPORATION, Rochester Hills, MI (US)

(72) Inventors: Leo Keselman, Menlo Park, CA (US); Derek Jung, Clinton Township, MI (US); Kenneth W. Krause, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 235 days.

(21) Appl. No.: 16/862,744

(22) Filed: Apr. 30, 2020

(65) Prior Publication Data

US 2020/0346350 A1    Nov. 5, 2020

Related U.S. Application Data

(60) Provisional application No. 62/843,120, filed on May 3, 2019.

(51) Int. Cl.
*B25J 9/16*      (2006.01)
*G06T 7/73*     (2017.01)
*G06T 19/00*   (2011.01)

(52) U.S. Cl.
CPC .......... *B25J 9/1692* (2013.01); *B25J 9/1697* (2013.01); *G06T 7/73* (2017.01); *G06T 19/006* (2013.01)

(58) Field of Classification Search
CPC ...... B25J 9/1605; B25J 9/1692; B25J 9/1697; G06T 19/006; G06T 7/70; G06T 7/73; G06T 7/75
See application file for complete search history.

(56) References Cited

U.S. PATENT DOCUMENTS

2018/0275632 A1*   9/2018   Zhang ................... B25J 9/1697
2021/0170603 A1*   6/2021   Kotlarski ............... B25J 9/1666

* cited by examiner

*Primary Examiner* — Spencer D Patton
(74) *Attorney, Agent, or Firm* — John A. Miller; Shumaker, Loop & Kendrick, LLP

(57) ABSTRACT

A system and method for calibrating the position of a machine having a stationary part to a stationary marker. The process first images the machine and the marker, and then identifies a visible part of the machine in the images that has been 3D modeled. The process then calculates a location of the stationary part of the machine using the modeled position of the visible part and the known kinematics and position of the machine. The process then identifies the stationary marker in the images, and establishes a relationship between the stationary marker and the stationary part of the machine, which can be used for calibration purposes. In one embodiment, the machine is a robot and the process is performed by an AR application.

18 Claims, 2 Drawing Sheets

ACTUATED MECHANICAL MACHINE CALIBRATION TO STATIONARY MARKER

CROSS-REFERENCE TO RELATED APPLICATIONS

This application claims the benefit of the filing date of U.S. Provisional Application 62/843,120, titled Actuated Mechanical Machine Calibration To Stationary Marker, filed May 3, 2019.

BACKGROUND

Field

This disclosure relates generally to a method for establishing a relationship between a machine and a fixed marker and, more particularly, to a method for calibrating a robot position relative to a stationary augmented reality marker by identifying a relationship between a modeled visible part of the robot, a stationary part of the robot and the marker.

Discussion

Augmented reality (AR) has been described as an interactive experience of a real-world environment where objects that reside in the real-world are enhanced by computer-generated perceptual information in the virtual world. The use of AR systems for simulating the operation of industrial robots for calibration purposes, teaching purposes, etc. is known in the art. An AR system can be used, for example, for teaching a robot how to perform a certain operation, such as painting a vehicle, welding vehicle body panels, etc. where a skilled operator uses the AR system to demonstrate the operation and the robot learns the motions involved in a manner well understood by those skilled in the art. The AR system can also be used for other teaching activities, such as establishment of virtual safety zones into which the robot must not encroach.

A 3D model of an object can be used to find the object in the real world using an imaging system, such as a camera, and a suitable algorithm, and can therefore be used to calibrate, i.e., find the offset or distance between a fixed marker and the object. For a moving mechanical system, such as a robot system, it is sometimes desirable to know the offset from a fixer marker to a static part of the robot, for example, for calibration purposes. However, this requires the static part of the system, such as a base portion of the robot, to be visible to the camera and have enough features to be detected by the camera. In the case where the static part is not visible or does not have enough features, it is difficult to use a moving part of the robot to perform the calibration.

SUMMARY

The following discussion discloses and describes a system and method for calibrating the position of a machine having a stationary part to a stationary marker. The process first images the machine and the marker, and then identifies a visible part of the machine in the images that has been 3D modeled. The process then calculates a location of the stationary part of the machine using the modeled position of the visible part and the known kinematics and position of the machine. The process then identifies the stationary marker in the images, and establishes a relationship between the stationary marker and the stationary part of the machine, which can be used for calibration purposes. In one embodiment, the machine is a robot and the process is performed by an AR application.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a method for establishing a calibration relationship between a machine and a fixed marker is merely exemplary in nature, and is in no way intended to limit the disclosure or its applications or uses.

The present disclosure proposes a system and method for calibrating a mechanical machine, such as robot, relative to a fixed marker. The method requires having knowledge of the current position of the machine, the kinematics of motion of the machine and a relationship between all components of the machine and a stationary part of the machine, where at least one of the components is 3D modeled, has significant features and is adequately visible. An AR application images the marker and the modeled component, correlates the modeled component to the stationary part using the kinematics, and then establishes a relationship between the stationary part and the marker.

Figure 1:
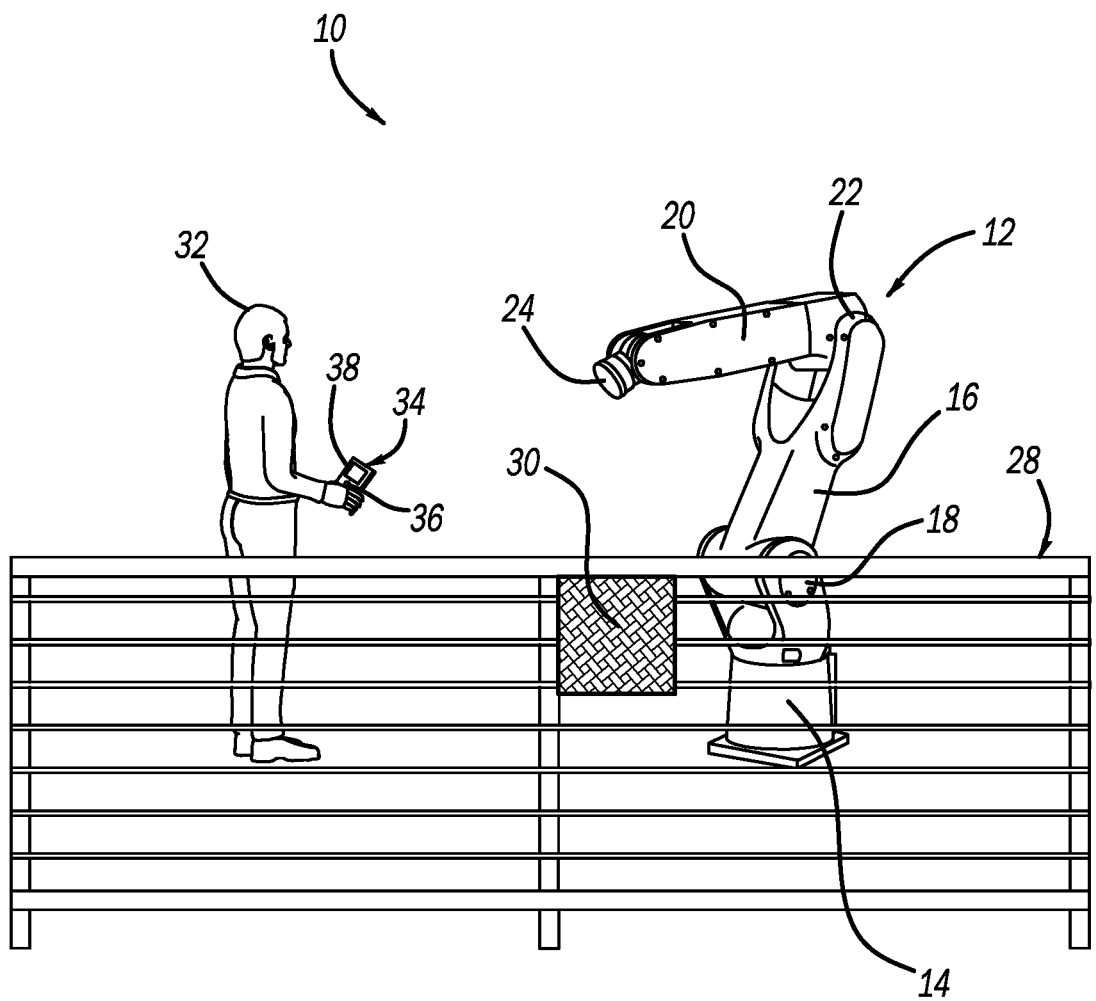
FIG. 1 is an isometric view of a work station including a robot and a fixed stationary marker.

FIG. 1 is an isometric view of a work station 10 including a machine, specifically a robot 12 having a base portion 14, an extension link 16 coupled to the base portion 14 by a rotary and pivotal joint 18, a working link 20 coupled to the extension link 16 opposite to the base portion 14 by an elbow pivot joint 22 and an end-effector 24, where a tool (not shown), such as a paint applicator, would be coupled to the end-effector 24. In the discussion below, the extension link 16 will be described as a visible part of the robot 12 that has adequate features and has been modeled by a known 3D model. Other parts of the robot 12 could also be used for this purpose as long as they have enough features to be modeled and identified, and are stationary during the calibration process. The base portion 14 would generally not be one of these components because it typically does not have enough features and/or is not visible enough. The robot 12 can be any multi-axis industrial robot suitable for the purposes discussed herein, such as a six-axis robot that can be programmed to perform a variety of operations in a manufacturing environment, such as material cutting, welding, part selection/movement/placement, painting, etc. The robot 12 has a known kinematics and geometry between the base portion 14, the links 16 and 20 and the end-effector 24, and a known configuration, i.e., its current position. Although the robot 12 is employed in this non-limiting embodiment, the calibration technique discussed herein will have application for calibrating other machines to a stationary marker.

A security fence 28 is provided at the work station 10 and is positioned around the robot 12 for safety purposes and operates in this discussion as a non-moving component separated from the robot 12. A stationary augmented reality marker 30, such as an image, model or other indicia, having a number of recognizable features is fixed to the fence 28 at a visible location thereon, where the marker can be fixed to other stationary components separated from the robot 12 in other embodiments. A user 32 is shown standing in the work station 10 and holding a tablet 34 on which has been downloaded an AR application, the kinematics of the robot 12 and the 3D model of the link 16. Many AR algorithms are known in the art that are suitable for the purposes discussed herein. The tablet 34 has a camera 36 that takes images of the work station 10 that are provided to the AR application and a display 38 that displays movement of the robot 12 in the work station 10, as well as other things. Other AR devices, such as AR glasses, a smartphone, etc., instead of the tablet 34 can also be employed.

The AR application operates an algorithm that can be used to establish a positional relationship between the marker 30 and the robot 12 to display information in the frame of the robot 12 relative to the marker 30 so as to watch simulated movement of the robot 12 on the display 38. To accomplish this, the user 32 directs the camera 36 towards the robot 12 so that the extension link 16 and the marker 30 are visible in the view of the camera 36. The algorithm uses the 3D model of the link 16 to recognize or identify the link 16 and using the kinematics or motion of the robot 12, determines the location of the base portion 14 that does not move during operation of the robot 12 relative to the link 16. The user 32 also locates the marker 30 in the view of the camera 36 so that both the marker 30 and the link 16 are visible in the display 38. The algorithm then determines the mathematical relationship or calibration between the marker 30 and the base portion 14. Thus, information that is known in the frame of the robot 12 can be displayed relative to the marker 30. Particularly, by knowing the relationship between the marker 30 and the base portion 14, and between the base portion 14 and the other parts of the robot 12, points on the robot 12 can be displayed relative to the marker 30 to show movement of the robot 12 on the display 38, for example, to watch a simulated operation of the robot 12.

Figure 2:
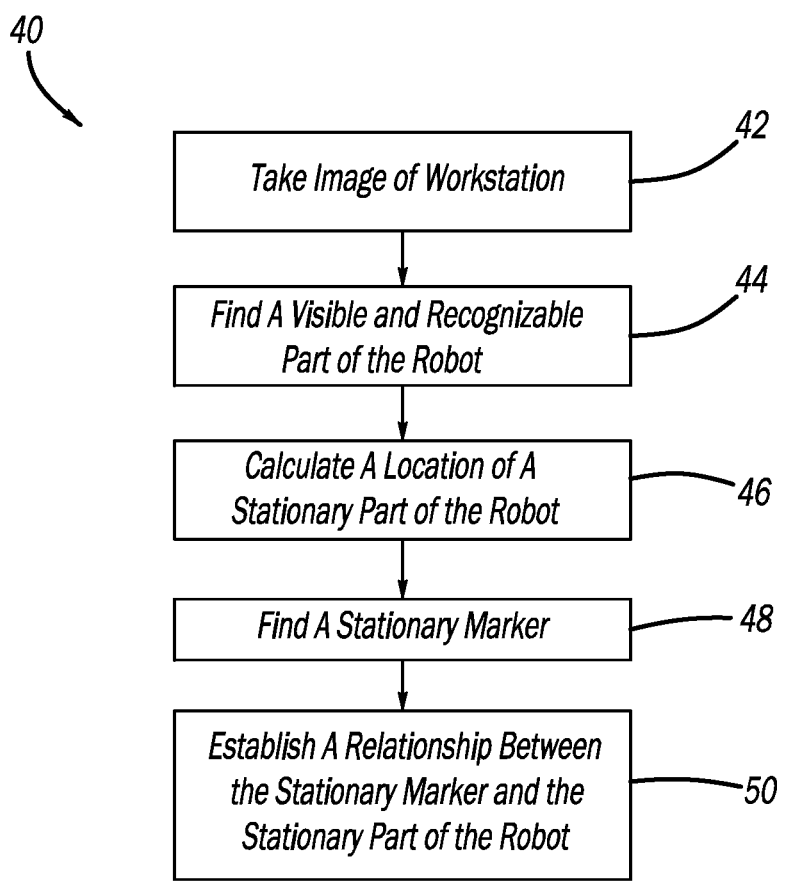
FIG. 2 is a flow chart diagram showing a process for establishing a calibration relationship between the robot and the stationary marker.

FIG. 2 is a flow chart diagram 40 showing a process for calibrating the position of the robot 12 relative to the augmented reality marker 30 as discussed above. The process first images the work station 10 using the camera 36 so that the robot 12 and the marker 30 are visible in the images at box 42. The process then identifies a visible and recognizable part of the robot 12, here the link 16, in the image that has been 3D modeled at box 44. The process then calculates a location of the stationary part, here the base portion 14, of the robot 12 from the modeled position of the link 16 and the known kinematics and position of the robot 12 at box 46. The process then identifies the stationary marker 30 in the images at box 48, and establishes a relationship between the stationary marker 30 and the base portion 14 of the robot 12 at box 50, which can be used for calibration and simulation purposes, as discussed.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for calibrating a position of a machine relative to a stationary marker, said method comprising:
obtaining images that include the machine and the marker;
identifying a location of a visible part of the machine in the images;
calculating a location of a stationary part of the machine using the location of the visible part, said stationary part being a different part of the machine than the visible part;
identifying a location of the stationary marker in the images;
establishing a relationship between the location of the stationary marker identified in the images and the location of the stationary part of the machine that was calculated using the location of the visible part; and
using the relationship between the stationary marker and the stationary part of the machine to display points on the machine to show a simulated operation of the machine.

2. The method according to claim 1 wherein identifying a location of the visible part of the machine includes using a 3D model of the visible part.

3. The method according to claim 1 wherein calculating a location of the stationary part of the machine includes calculating a location of the stationary part of the machine using known kinematics of the machine and a position of the machine.

4. The method according to claim 1 wherein an augmented reality algorithm is used to perform the method.

5. The method according to claim 1 wherein the machine is a robot.

6. The method according to claim 5 wherein the marker is located on a safety fence surrounding a robot work space.

7. The method according to claim 5 wherein the visible part is an intermediate link of the robot and the stationary part is a base portion of the robot, where the intermediate link is coupled to the base portion.

8. The method according to claim 1 wherein obtaining images includes using a camera.

9. The method according to claim 8 wherein the camera is part of a tablet, smartphone or augmented reality (AR) glasses.

10. A method for calibrating a position of a robot relative to an augmented reality (AR) marker using an AR algorithm, said method comprising:
3D modeling a visible part of the robot;
obtaining images, using a camera, that include the robot and the AR marker;
locating the visible part of the machine in the images using the model;
calculating a location of a stationary part of the machine using the location of the visible part and known kinematics of the robot, said stationary part being a different part of the robot than the visible part;
locating the AR marker in the images;
establishing a relationship between the location of the AR marker identified in the images and the location of the stationary part of the robot that was calculated using the location of the visible part; and
using the relationship between the AR marker and the stationary part of the robot to display points on the robot to show a simulated operation of the robot.

11. The method according to claim 10 wherein the marker is located on a safety fence surrounding a robot work space.

12. The method according to claim 10 wherein the visible part is an intermediate link of the robot and the stationary part is a base portion of the robot, where the intermediate link is coupled to the base portion.

13. The method according to claim 10 wherein the camera is part of a tablet, smartphone or augmented reality (AR) glasses.

14. A system for calibrating a position of a machine relative to a stationary marker, said system comprising:
- means for obtaining images that include the machine and the marker;
- means for identifying a location of a visible part of the machine in the images;
- means for calculating a location of a stationary part of the machine using the location of the visible part, said stationary part being a different part of the machine than the visible part;
- means for identifying a location of the stationary marker in the images;
- means for establishing a relationship between the location of the stationary marker identified in the images and the location of the stationary part of the machine that was calculated using the location of the visible part; and
- means for using the relationship between the stationary marker and the stationary part of the machine to display points on the machine to show a simulated operation of the machine.

15. The system according to claim 14 wherein the means for identifying a location of a visible part uses a 3D model of the visible part.

16. The system according to claim 14 wherein the means for calculating a location of the stationary part of the machine calculates a location of the stationary part of the machine using known kinematics of the machine and a position of the machine.

17. The system according to claim 14 wherein the machine is a robot, the visible part is an intermediate link of the robot and the stationary part is a base portion of the robot, where the intermediate link is coupled to the base portion.

18. The system according to claim 17 wherein the marker is located on a safety fence surrounding a robot work space.

* * * * *